United States Patent [19]
Yamane

[11] Patent Number: 5,836,825
[45] Date of Patent: Nov. 17, 1998

[54] PROPELLER SHAFT FOR VEHICLE

[75] Inventor: Yasuo Yamane, Wako, Japan

[73] Assignee: Honda Giken Kogyo Kabushiki Kaisha, Tokyo, Japan

[21] Appl. No.: 773,349

[22] Filed: Dec. 26, 1996

[30] Foreign Application Priority Data

Dec. 28, 1995 [JP] Japan ................................. 7-342315

[51] Int. Cl.$^6$ ................................................. F16C 3/00
[52] U.S. Cl. ........................... 464/181; 464/182; 464/183
[58] Field of Search .................................... 464/112, 134, 464/179, 181, 182

[56] References Cited

U.S. PATENT DOCUMENTS

| | | | |
|---|---|---|---|
| 4,238,539 | 12/1980 | Yates et al. | 464/181 |
| 4,358,284 | 11/1982 | Federmann et al. | 464/112 X |
| 4,932,924 | 6/1990 | Lobel | 464/181 |
| 5,118,214 | 6/1992 | Petrzelka et al. | |
| 5,222,915 | 6/1993 | Petrzelka et al. | 464/181 |
| 5,309,602 | 5/1994 | Shinohara et al. | 464/181 X |
| 5,320,579 | 6/1994 | Hoffman | 464/181 |
| 5,601,493 | 2/1997 | Nakazono et al. | 464/181 |

FOREIGN PATENT DOCUMENTS

| | | |
|---|---|---|
| 3421191 | 12/1985 | Germany ................................. 464/181 |
| 39 20 793 A1 | 1/1991 | Germany . |
| 41 19 359 A1 | 1/1992 | Germany . |
| 44 07 520 A1 | 9/1995 | Germany . |
| 40-1074315 | 3/1989 | Japan ................................. 464/181 |
| 2-231229 | 9/1990 | Japan ................................. 464/181 |

OTHER PUBLICATIONS

Abstract of German patent document DE 4407520A1, Sep. 1995.

"The Filament Winding of Hybrid Composite Driveshafts", pp. 306–317; James Sabo, Celanese Research Company, Summit, New Jersey; Reprint from 25th National SAMPE Symposium & Exhibition, May 6–8 1980. 481–492.

*Primary Examiner*—Randolph A. Reese
*Assistant Examiner*—Eileen A. Dunn
*Attorney, Agent, or Firm*—Armstrong, Westerman, Hattori, McLeland & Naughton

[57] ABSTRACT

A propeller shaft including an FRP tube and joints connected to at least one end of said FRP tube. The FRP tube includes cylindrical end portions into which cylindrical portions of the joints are press-fitted, and intermediate tubular portions which have tapered inner peripheral surfaces connected at their large-diameter ends to terminal ends of inner peripheral surfaces of the cylindrical end portions and which are formed by a helical winding. The intermediate tubular portion is formed as a portion which is to be broken upon collision of the vehicle, and the cylindrical portion of the joint is formed as a breaking member which is adapted to collide against the tapered inner peripheral surface of the intermediate tubular portion by sliding under a shock load. In this way, a propeller shaft can be provided which is capable of absorbing a shock load upon collision of the vehicle.

3 Claims, 4 Drawing Sheets

PROPELLER SHAFT FOR VEHICLE

BACKGROUND OF THE INVENTION

1. Field of the Invention

The present invention relates to a propeller shaft for a vehicle, comprising a fiber reinforced plastic tube and a joint connected to at least one end of the FRP tube, the FRP tube including a cylindrical end portion into which a cylindrical portion of the joint is press-fitted, and an intermediate tubular portion which has a tapered inner peripheral surface continuously formed at a large-diameter end thereof to a terminal end of an inner peripheral surface of the cylindrical end portion and which is formed in a helical winding manner.

2. Description of the Related Art

When a vehicle collides and a propeller shaft receives the resulting shock load, it is desirable that the propeller shaft itself exhibits a shock load absorbing effect.

In a propeller shaft using a tube made of a steel, the tube is formed in a bisected manner and has a joint mounted between the bisected parts, so that a shock load produced upon collision of the vehicle is absorbed by buckling of the tube at a joint of the bisected parts. Whereas, in a propeller shaft using an FRP tube, however, the FRP tube is formed into an integral type for the main purpose of reducing weight, and hence, such propeller shaft is not provided with a joint of the above-described type.

The FRP tube is also required to be buckled by the shock load upon collision of the vehicle, but the FRP tube is not buckled by a low shock load, because the FRP tube has a relatively large buckling load.

SUMMARY OF THE INVENTION

Accordingly, it is an object of the present invention to provide a propeller shaft of the above-described type which is formed so that the FRP tube can be broken by a shock load produced by collision of the vehicle in view of a relatively low interlaminar shear strength characteristic of the FRP tube.

To achieve the above object, according to the present invention, there is provided a propeller shaft for a vehicle, comprising an FRP tube and joint connected to at least one end of the FRP tube, the FRP tube including a cylindrical end portion into which a cylindrical portion of the joint is press-fitted, and an intermediate tubular portion which has a tapered inner peripheral surface continuously formed at a large-diameter end thereof to a terminal end of an inner peripheral surface of the cylindrical end portions and which is formed in a helical winding manner, wherein the intermediate tubular portion is made as a portion which is to be broken at the time of collision of the vehicle, and the cylindrical portion of the joint is made as a breaking member which collides against the tapered inner peripheral surface of the intermediate tubular portion by sliding under a shock load.

The intermediate tubular portion is formed in a helically winding manner and hence, fiber bundles appear on the tapered inner peripheral surface to form a layer in accordance with the number of the fiber bundles wound. Thus, when the cylindrical portion is allowed to collide against the tapered inner peripheral surface by sliding under a shock load upon collision of the vehicle, the layer between the adjacent fiber bundles is sheared, because the intermediate tubular portion has a relatively low interlaminar shear strength, and as a result, each of the fiber bundles is sheared. Finally, the intermediate tubular portion is broken.

The breaking of the intermediate tubular portion occurs at a shock load equal to 15 to 20% of a buckling load of the FRP tube.

With the above-described construction, a propeller shaft can be provided which is capable of reliably absorbing a shock load resulting from collision of the vehicle.

The above and other objects, features and advantages of the invention will become apparent from the following description of a preferred embodiment taken in conjunction with the accompanying drawings.

DESCRIPTION OF THE PREFERRED EMBODIMENTS

The present invention will now be described by way of a preferred embodiment with reference to the accompanying drawings.

Figure 1:
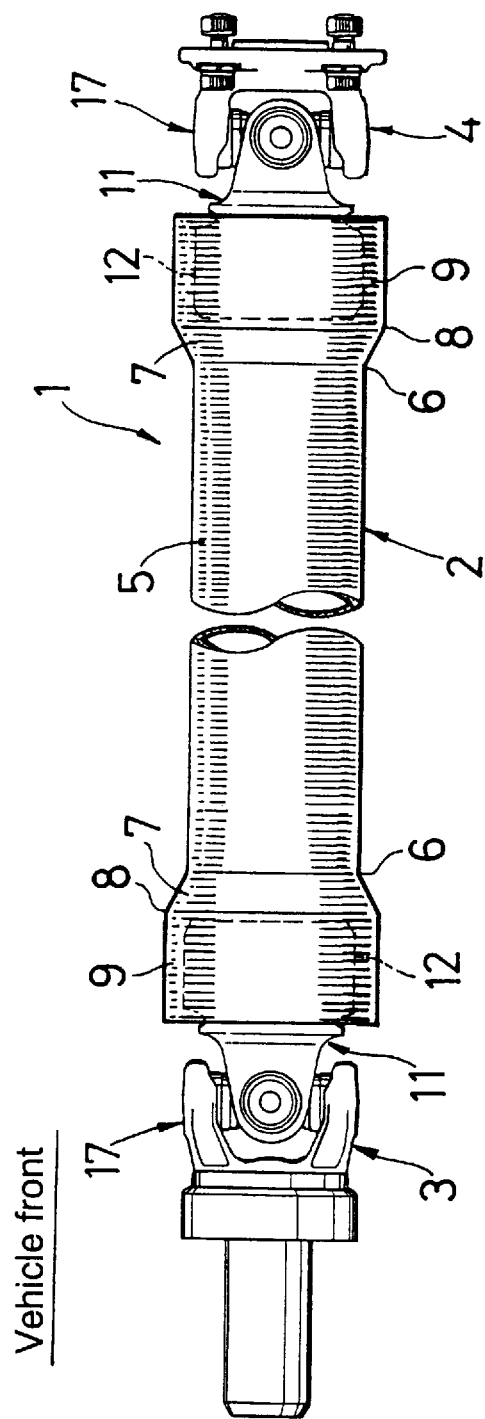
FIG. 1 is a plan view, of a propeller shaft of the present invention.
Figure 2:
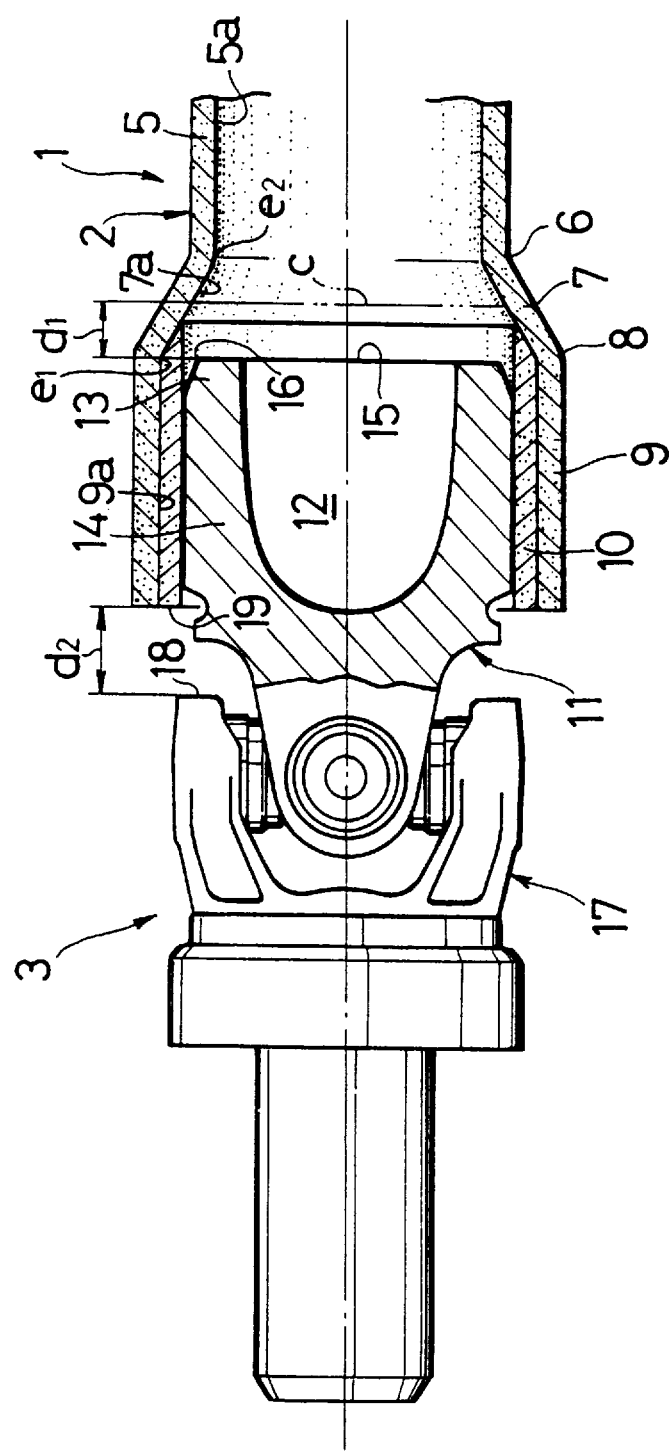
FIG. 2 is an enlarged vertical sectional view of an essential portion shown in FIG. 1.

Referring to FIGS. 1 and 2, a propeller shaft 1 for a vehicle includes an FRP tube 2 extending in a longitudinal direction of the vehicle, and a pair of universal joints 3 and 4 as joints connected to at least one end, (opposite ends in this embodiment) of the FRP tube 2. The FRP tube 2 includes a tube body 5 having a uniform diameter over its entire length, and a pair of tapered intermediate tubular portions 7 having small-diameter ends 6 continuously formed to terminal ends of the tube body 5 on the front and rear sides of the vehicle, respectively. The FRP tube 2 further includes a pair of cylindrical end portions 9 connected at each end to large-diameter ends 8 of the intermediate tubular portions 7 and each having a uniform diameter over its entire length.

As is more clearly shown in FIG. 2, each of the intermediate tubular portions 7 has a tapered inner peripheral surface 7a including a large-diameter end $e_1$ and a small-diameter end $e_2$. The large-diameter end $e_1$ is continuously formed to an end of an inner peripheral surface 9a of the cylindrical end portion 9, and the small-diameter end $e_2$ is continuously formed to an end of an inner peripheral surface 5a of the tube body 5. Each of the intermediate tubular portions 7, e.g., the FRP tube 2 in the embodiment, is formed by helically winding a bundle of carbon fibers impregnated with a resin. Each of the cylindrical end portions 9 has an FRP short sleeve 10 bonded to the entire inner peripheral surface 9a thereof and having an inner end extending to the tapered inner peripheral surface 7a. The FRP short sleeve 10 is formed by circumferentially winding a bundle of carbon fibers impregnated with a resin.

In one of the yokes 11 of the universal joints 3 and 4, a cylindrical portion 12 includes a tapered cylindrical portion 13 on the side of a tip end and a cylindrical portion 14 having a uniform diameter connected to the tapered cylindrical portion 13. A serration (not shown) having ridgelines extending axially is defined in an outer peripheral surface of the uniform-diameter cylindrical portion 14, and the uniform-diameter cylindrical portion 14 is press-fitted into the FRP short sleeve 10. Thus, the universal joints 3 and 4 are connected to the FRP tube 2, and an outer peripheral edge 16 in an annular inner end face 15 of the tapered cylindrical portion 13 is opposed to the tapered inner peripheral surface 7a.

In this instance, a distance $d_1$ between the outer peripheral edge 16 of the cylindrical portion 12 in one yoke 11 and a phantom circle c of the tapered inner peripheral surface 7a opposed to the outer peripheral edge 16 is set to be less than a distance $d_2$ between an end face 18 of the other yoke 17 and an annular outer end face 19 of the FRP short sleeve 10 (i.e., $d_1 < d_2$), so that the end face 18 of the other yoke 17 can collide against the annular outer end face 19 of the FRP short sleeve 10 opposed to the end face 18 after collision of the outer peripheral edge 16 of the cylindrical portion 12 in yoke 11 against the tapered inner peripheral surface 7a. The angle $\theta_1$ between the tapered inner peripheral surface 7a and the center axis of the FRP tube is greater than the $\theta_2$ between the outer peripheral edge 16 and the center axis of the FRP tube, as shown in FIG. 2.

Figure 3A:
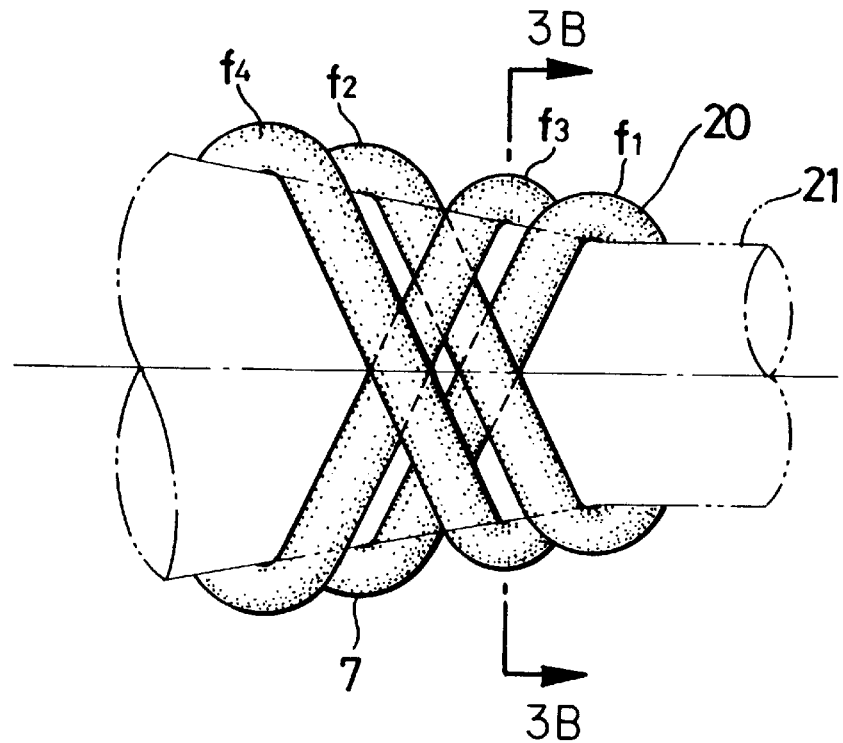
FIG. 3A is an illustration for explaining a helical winding of the present invention.
Figure 3B:
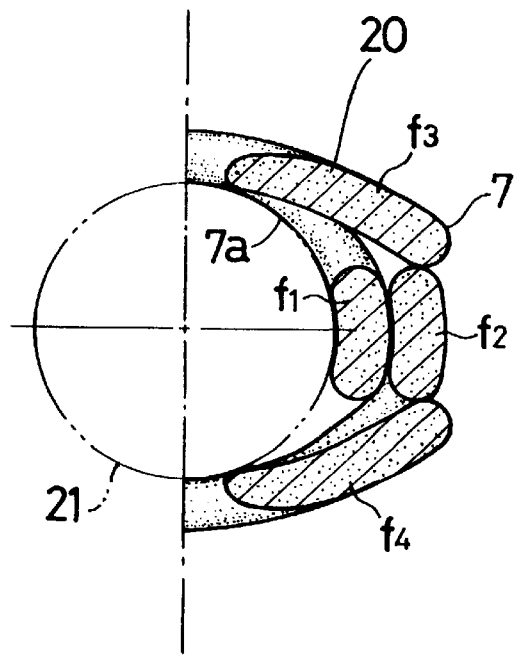
FIG. 3B is a sectional view taken along the line 3B—3B in FIG. 3A.

As shown in FIGS. 3A and 3B, the intermediate tubular portion 7 is formed by the helical winding using a mandrel 21 and hence, the carbon fiber bundle 20 appears on the tapered inner peripheral surface 7a to form a layer in accordance with the number of windings of the carbon fiber bundle 20, as shown by characters $f_1$ to $f_4$.

Figure 4:
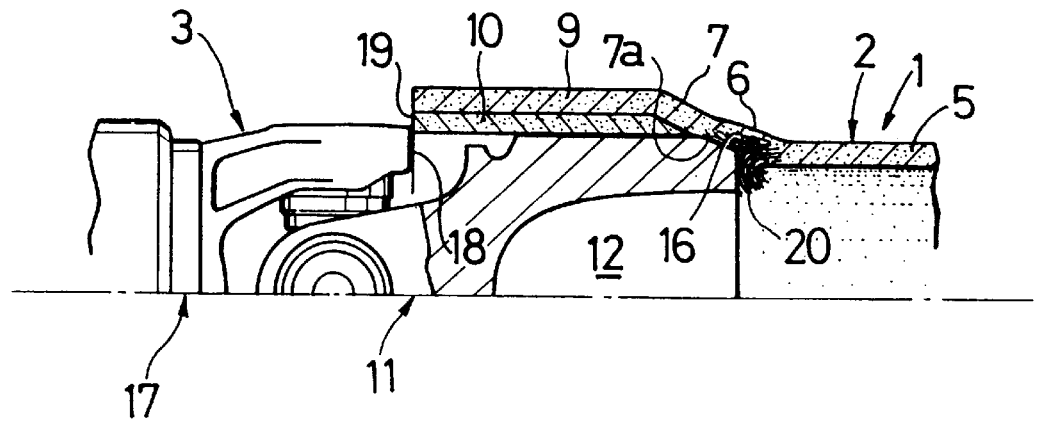
FIG. 4 is a view showing a breaking process of an FRP tube of the present invention.

Thereupon, if the outer peripheral edge 16 of the cylindrical portion 12 in the yoke 11 at the front portion of the vehicle is allowed to collide against the phantom circle c of the tapered inner peripheral surface 7a by sliding under a shock load upon a frontal collision of the vehicle, a layer between both the adjacent carbon fiber bundle turns 20 is sheared and as a result, each of the carbon fiber bundle turns 20 are sheared, as shown in FIG. 4, because the intermediate tubular portion 7 has a relatively low interlaminar shear strength characteristic. At the same time, the small-diameter end 6 of the intermediate tubular portion 7 and the vicinity thereof are pushed and enlarged radially outwards to become reduced in brittleness.

Figure 5:
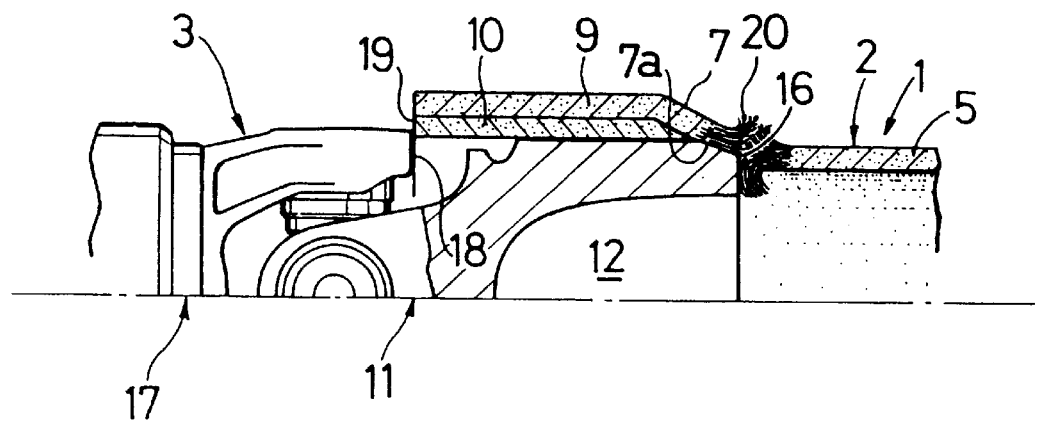
FIG. 5 is a view illustrating the completion of the breaking of the FRP tube.

Then, the end face 18 of the other yoke 17 may collide against the outer end face 19 of the FRP short sleeve 10, as shown in FIG. 5, and finally, the intermediate tubular portion 7 is broken. Thereafter, the yoke 11 is separated from the FRP tube 2 and moved axially.

In this way, the shock load acting on the propeller shaft 1 resulting from a frontal collision of the vehicle can reliably be absorbed as a result of the intermediate tubular portion 7 acting as an area to be broken at the time of the frontal collision of the vehicle, and the cylindrical portion 12 acting as a breaking member which collides against the tapered inner peripheral surface 7a by sliding under the shock load. For example, when a buckling load of the FRP tube 2 is 16.6 tons, the intermediate tubular portion 7 can be broken with a shock load of about 2.6 tons.

Figure 6:
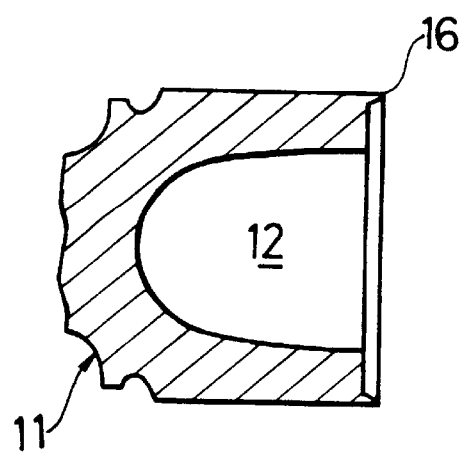
FIG. 6 is an enlarged sectional view of a modification of a yoke of the present invention.

FIG. 6 shows an outer peripheral edge 16 of the cylindrical portion 12, which is formed sharply. Thus, the bite of the outer peripheral edge 16 into the tapered inner peripheral surface 7a can be improved.

When another vehicle collides with the subject vehicle from the rear, a breaking action similar to that described above occurs at a connection between the universal joint 4 at the rear portion of the vehicle and the FRP tube 2, whereby a shock load acting on the propeller shaft 1 can be absorbed.

What is claimed is:

1. A propeller shaft for a vehicle, comprising:

an FRP (fiber-reinforced plastic) tube; and a joint having a cylindrical portion including a tapered cylindrical portion connected to at least one end of said FRP tube, said FRP tube including a cylindrical end portion into which said cylindrical portion of said joint is press-fitted, and an intermediate tubular portion which has a tapered inner peripheral surface continuously formed at a large-diameter end thereof to a terminal end of an inner peripheral surface of the cylindrical end portion and which is formed in a helical winding manner, wherein said intermediate tubular portion is formed as a portion which is to be broken at the time of collision of the vehicle, and said cylindrical portion of said joint is formed as a breaking member which collides against the tapered inner peripheral surface of said intermediate tubular portion by sliding in response to a shock load.

2. A propeller shaft according to claim 1, wherein said tapered cylindrical portion of said joint has a tapered outer peripheral edge.

3. A propeller shaft according to claim 2, wherein an angle defined between said tapered inner peripheral surface of said intermediate tubular portion and a central axis of said FRP tube is greater than an angle defined between said tapered outer peripheral edge of said joint and the central axis of said FRP tube.

* * * * *